United States Patent Office 3,705,247
Patented Dec. 5, 1972

3,705,247
METHOD OF CONTROLLING NEMATODES
Herman Breuer, Regensburg, Germany, assignor to E. R. Squibb & Sons, Inc., New York, N.Y.
No Drawing. Original application July 24, 1968, Ser. No. 747,103, now Patent No. 3,575,997. Divided and this application June 5, 1970, Ser. No. 57,390
Int. Cl. A01n 9/28
U.S. Cl. 424—272                 2 Claims

ABSTRACT OF THE DISCLOSURE 3-amino-5-n-undecyl-1,2,4-oxadiazole and salts thereof and methods for their use as nematocides and aquatic herbicides.

---

This application is a division of application Ser. No. 747,103, filed July 24, 1968, now U.S. Pat. No. 3,575,997.

This invention relates to a novel oxadiazole, namely 3-amino-5-n-undecyl-1,2,4-oxadiazole, its salts and their use as nematocides and aquatic herbicides.

Nematodes are round worms which infest soil and attack plants throughout the world. Plants infected by pathogenic nematodes have a weak, sickly appearance. The roots of affected plants are stunted. Numerous galls, knots or lesions form on the roots. The plant may appear nutritionally deficient.

Methods and compositions heretofore known for the control of nematodes have usually been either inconvenient to use or too expensive for widespread application. Many nematocides are highly injurious not only to man and animals but are phytotoxic to plants and seeds. It is especially unexpected to discover an effective nematocide which is substantially non-toxic to plants. The disadvantages of the prior art compositions and methods are avoided according to this invention by treating soil infested with nematodes with the compounds of this invention.

The compounds of this invention find further utility as aquatic herbicides. To control aquatic weeds, the compounds of this invention are applied to the water in which the weeds are growing in concentrations of from about 0.001 to 10 parts per million, preferably from 0.001 to 2 parts per million of water.

Included among the aquatic plant pests which are conveniently controlled in accordance with this invention are: submersed plants such as bladderwort (Utriculari sp.), bushy pondweed (Najas sp.), coontail (Ceratophyllum sp.), elodea, fanwort (Cabomba sp.), pondweeds (Pontamogenton sp.), water milfoil (Myriophyllum sp.), waterweed (Anacharis Elodea sp.), water star grass (Heteranthera sp.), and wild celery (Vallisneria sp.), floating weeds such as duckweed (Lemna), floating fern (Ceratopteris sp.), waterfern (Salvinia sp.), water hyacinth (Eichhornia sp.), water lettuce (Pistia sp.), and water meal (Wolffia), rooted plants with floating leaves such as water lillies (Nuphar sp., Nyphaea sp.) and lotus (Nelumbo sp.), emersed plants such as alligatorweed (Alternanthera), arrowhead (Sagittaria), bulrush (Scripus sp.), cattails (Typha sp., lizardtail (Saururus), rush (Juncus sp.), parrotfeather (Myriophyllum), water pennywort (Hydrocotyle sp.), pickerelweed (Pontederia), sawgrass (Cladium), smartweed (Polygonum sp.), spikerrush (Eleocharis sp.), water leaf Hydrolea sp.), water primrose (Jussiaea sp.), cut-grass (Zizaniopsis), black willow (Salix sp.), buttonbush (Cephalanthus sp.) and ditchbank grasses such as southern cutgrass (Leersia), floating-grass (Paspalum), jaragua (Hyparrhenia), knotgrass (Paspalum), maidencane (Panicum), common reeds and watergrass (Hydrochloa). The foregoing list is by way of example only and is not intended to limit the scope of the invention.

An important advantage to the use of the compounds of this invention is selectivity. Although these compounds exhibit very good herbicidal effect upon aquatic weeds, they have little or no effect upon the usual broadleaf varieties of weeds found on land and, in addition, may be employed at high rates of application for the control of nematodes in farm crops without fear of injury to the seeded crop itself.

In use these compounds are applied in any of a variety of formulations. Preferably the compounds are extended with carriers or conditioning agents of the kind used and commonly referred to in the art as adjuvants or modifiers. Such adjuvants may be inert solids, surface-active agents and/or organic liquids.

The compounds of this invention are incorporated in such compositions in sufficient amount to exert the desired effect. Usually from about 1 to 95 percent by weight of the compounds are included in such formulations.

Solid formulations may be prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively nonabsorptive china clays, diatomaceous earth, walnut shell flour, redwood flour, synthetic fine silica, calcium silicate and other inert solid carriers of the kind conventionally employed in powder formulations are used.

The active ingredient is suitably about 1 to 95 percent by weight of the compositions. The solids preferably are finely divided and have a particle size below about 50 microns or, better, below about 20 microns. Dust formulations are prepared using talc, pyrophyllite, tobacco dust, volcanic ash or other dense, inert solids as diluents.

Liquid compositions are prepared by mixing the active compound with suitable liquid diluent media. The active compound is either in solution or in suspension in the liquid medium. Suitable liquid media include kerosene, Stoddard solvent xylene, alcohols, alkylated naphthalenes, diesel oil, glycols, and ketones, for example, diisobutyl ketone and cyclohexanone. The active ingredient is preferably from about 0.5 to 50 percent by weight of these liquid compositions. These compositions are used as such or extended by emulsification with water.

The wettable powders or liquids of this invention suitably include one or more surface-active agents, for example, wetting, dispersing, or emulsifying agents. Compositions containing these surface-active agents disperse or emulsify easily in water to form aqueous sprays. The compositions suitably contain up to 10 percent by weight of the surface-active agents, but some surface-active agents are effective at less than 1 percent.

Surface-active agents are suitably of the anionic, cationic, or nonionic type. Exemplary of such agents are sodium oleate, sulfonated petroleum oils, alkyl aryl sulfonates, sodium lauryl sulfate, polyethylene oxides, lignin sulfonates, and the like. Additional suitable agents are described by McCutcheon in "Soap and Chemical Specialties," volume 31, Nos. 7–10 (1955).

Nematocidal compositions are applied to cultivated land and mixed with top soil. The rate of application is sufficient to exert the desired nematocidal action. Dosage depends on the components of the formulation, method of application, type and quantity of nematodes, duration, of treatment, climatic conditions and lesser factors. Application rates of from 1 to 50 pounds of the active ingredient per acre are usually satisfactory for nematode control, but higher rates may also be used. After application, the compositions are preferably worked into the ground to a depth of 4 to 6 inches.

In the case of aquatic weeds, periodic treatments may be required for effective control in flowing water. In the case of rooted aquatic plants, it is often desirable to employ the active ingredient in a heavy vehicle such as a granule (e.g., attapulgite clay granules) which will carry it to the stream bed, and which will resist movement by the currents, thus increasing the length of time that the herbicide remains in the vicinity of the weed roots.

On the other hand, to control plants characterized by substantial foliage floating on top of the water (e.g., duckweed, floating fern, water hyacinth, water lettuce, and so forth), this active ingredient is more advantageously applied with a carrier lighter than water, such as wood shavings, ground corn cobs or organic emulsions, particularly inverse emulsions. This results in the herbicide being entrapped in the foliage as it floats downstream and thus provides convenient exposure of the foliage to a high concentration of the herbicide.

Also contemplated within the scope of this invention is the use of salts of 3-amino-5-n-undecyl-1,2,4-oxadiazole. Salts coming within the purview of this invention include the acid-addition salts, particularly, the non-toxic acid-addition salts which result from the reaction of the base with the inorganic or organic acids. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The following examples are representative of the invention, although not necessarily limiting its scope. All temperatures are in degrees centigrade:

EXAMPLE 1

To a solution of 101 grams of triethylamine in two liters of anhydrous benzene, cooled to 5°, there is added slowly, with vigorous stirring, a solution of 109 grams of dodecanoyl chloride in 500 ml. of benzene. The reaction mixture is kept at 5–10° by cooling in an ice-bath. The mixture is stirred for 30 minutes and the cooling bath is removed. A solution at 21 grams of cyanamide in anhydrous benzene is added slowly with vigorous stirring, during which time the reaction mixture is kept at 25–35°.

The reaction mixture is diluted with petroleum ether and the crude product separates as the lower layer. The crude product is diluted with dioxane, filtered from the triethylamine hydrochloride and the filtrate diluted with petroleum ether to yield the desired dodecanoylcyanamide.

56 grams of hydroxylamine hydrochloride are dissolved in 250 ml. of pyridine and then 112 grams of dodecanoylcyanamide slowly added and the temperature is maintained at about 40° by outside cooling. The reaction mixture is kept overnight in a refrigerator, diluted with water and made alkaline with sodium hydroxide solution. The crystals which precipitate are filtered under suction in the cold, then washed with water to obtain 3-amino-5-n-undecyl-1,2,4-oxadiazole, M.P. 91–93°.

EXAMPLE 2

3-amino-5-n-undecyl-1,2,4-oxadiazole was tested against a species of Meloidogyne which produces galls or root knots on the roots of tomato, cucumber, squash, and so forth. In this test steam-sterilized soil is infested with 6 grams of finely chopped galled tomato roots per gallon of soil. 3-amino-5-n-undecyl-1,2,4-oxadiazole is then mixed with the soil at rates of 0.1 to 0.5 gram per gallon, which are the equivalent to field rates of nematocides now in use. The treated infested soil is covered and held for one week, after which tomato plants, cucumber seeds, and squash seeds are transplanted into four replicate subsamples. About four weeks later, the roots are washed free of soil and the effectiveness of the chemical is determined by counting the number of galls from treated versus untreated soil. In this test the compound produced 100 percent root knot control at 0.5 gram per gallon without causing injury to the tomato or cucumber plants. The condition of roots, tops and the height of the plants grown in the treated soil were normal. No phytotoxicity was observed.

EXAMPLE 3

A nematocidal powder is prepared by blending 75 parts of 3-amino-5-n-undecyl-1,2,4-oxadiazole with 20 parts of fine attapulgite clay, 2 parts of alkylated naphthalene sulfonic sodium salt wetting agent, 0.2 part of low viscosity methyl cellulose dispersant and 2.8 parts of disodium phosphate (all parts by weight). The mixture is ground to an average particle size of about 50 microns and blended until homogeneous.

About 5 pounds of this formulation are dispersed in 100 gallons of water and applied at a rate of 50 pounds of active ingredient per acre to land infested with pathogenic nematodes. The soil is then disced. Cucumbers grown in the treated soil are normal and free from nematode infection.

EXAMPLE 4

An aqueous suspension is prepared by mixing 3-amino-5-n-undecyl-1,2,4-oxadiazole with the other ingredients listed below and then wet milling the mixture.

|  | Parts by wt. |
| --- | --- |
| 3-amino-5-n-undecyl-1,2,4-oxadiazole | 30 |
| Sodium lignosulfonate | 15 |
| Fuller's earth | 3.3 |
| Low viscosity methyl cellulose | 0.5 |
| Disodium phosphate | 1.0 |
| n-Octyl alcohol | 0.2 |
| Water | 50.0 |

This suspension mixes readily with water to form substantially non-flocculating aqueous dispersions, and is applied using conventional spray equipment at a rate of 40 pounds of active agent per acre. Tomatoes grown in the treated soil are normal and free from nematode infection.

EXAMPLE 5

An emulsifiable oil composition is prepared by blending 3-amino-5-n-undecyl-1,2,4-oxadiazole wetting agent and oil together until a completely homogeneous mixture is obtained.

|  | Parts by wt. |
| --- | --- |
| 3-amino-5-n-undecyl-1,2,4-oxadiazole | 33 |
| Polyoxyethylene sorbitan trioleate | 11 |
| Stoddard solvent | 56 |

This composition disperses in water to form an emulsion suitable for application as a spray. One part of this formulation is diluted with 5 parts water (parts by volume) and the resulting emulsion applied at the rate of 40 gallons per acre. Squash grown in the treated soil are normal and free from nematode infection.

EXAMPLE 6

Nematocidal dust is prepared by blending 3-amino-5-n-undecyl-1,2,4-oxadiazole with the diluents listed below and micropulverizing the mix to an average particle size of about 30 microns. The resulting mixture is suitably applied with ordinary dusting equipment at a rate of 30 pounds of active ingredient per acre.

|  | Parts by wt. |
| --- | --- |
| 3-amino-5-n-undecyl-1,2,4-oxadiazole | 15 |
| Diatomaceous silica | 20 |
| Pyrophyllite | 60 |
| Lauryl alcohol | 5 |

Cucumbers grown in the treated soil are normal and free from nematode infection.

EXAMPLE 7

Aquatic herbicidal activity was determined in the following manner. Both duckweed and an algae mixture was grown in Hillman's medium which contains:

| | Mg./l. |
|---|---|
| $KNO_3$ | 1515 |
| $Ca(NO_3)_2 \cdot 4H_2O$ | 1180 |
| $KH_2PO_4$ | 680 |
| $MgSO_4 \cdot 7H_2O$ | 492 |
| $H_3BO_3$ | 2.86 |
| $ZnSO_4 \cdot 7H_2O$ | 0.22 |
| $Na_2MoO_4 \cdot 2H_2O$ | 0.12 |
| $CuSO_4 \cdot 5H_2O$ | 0.08 |
| $MnCl_2 \cdot 4H_2O$ | 3.62 |
| $FeCl_3 \cdot 6H_2O$ | 5.40 |
| Tartaric acid | 3.0 |

The test compound was then added to half of the tubes. Fronds of duckweed were added to several tubes and mixed algae were added to several others, half containing the test compounds and half not. The inoculated tubes were placed on slanting boards in a 75° F. constant temperature room which was illuminated fourteen hours per day. After ten days incubation, the treated and control tubes were compared. In the control tubes a ten-fold increase in frond numbers of duckweed was observed. A corresponding increase in the growth of mixed algae was also noted. In this test at a concentration of ten parts per million, 3 - amino - 5-n-undecyl-1,2,4-oxadiazole gave 100 percent control of both mixed algae and duckweed.

EXAMPLE 8

3-amino-5-n-undecyl-1,2,4-oxadiazole was applied to five aquatic plants (Pithophora, Najas, Potamogeton, Water Star-Grass and Elodea) as a dilute aqueous solution in a concentration of 10 parts per million by weight. Four- to six-inch cuttings of each aquatic plant were placed in a one-gallon glass jar with dechlorinated tap water. The jars were tightly covered to prevent evaporation and contamination of the water. The planted jars were illuminated by cool, white, thin-line fluorescent lamps. The intensity of the illumination of the water surface was from 60- to 100-foot candles. The plants were illuminated for 10 hours each day from 8 a.m. to 6 p.m. They were allowed to remain in the jars for a conditioning period of three weeks, during which time fertilizer was periodically added to the jars. At the end of this time the jars were checked to be sure that the plants were vigorously growing. Any jar with discolored or dead plants was discarded from further use. An aqueous solution containing 10 parts per million of the test compound was then added to the jars and the jars immediately tightly sealed. The jars were then maintained under the same conditions for an additional three weeks as during the three-week conditioning period. At the end of the test period, the effects of the test compounds were evaluated. Evaluation of herbicidal effects for the chemical on each species of plant was by visual observation, with injury to the plant rated on a scale of 1 (no visible injury) to 10 (a dead plant). Ratings from 1 to 3 indicate no, or very slight, herbicidal actvity, from 4 to 6 indicate moderate herbicidal activity, and from 7 to 9 indicate definite to severe herbicidal activity. Independent ratings were made on each species of plant. These ratings were then averaged for each of three replications and these results again averaged to determine an overall average effect expressed as percent herbicidal effectiveness. In this test the compound exhibited an average overall effectiveness of over 90 percent. In no case did any rating fall below 7.

This invention may be variously otherwise embodied within the scope of the appended claims.

What is claimed is:

1. A method of controlling nematodes, which comprises applying to soil infested with nematodes a composition containing from about 1 to 95 percent by weight of 3-amino-5-undecyl-1,2,4-oxadiazole or salts thereof.

2. A method in accordance with claim 1 wherein the composition applied to soil infested with nematodes contains from about 1 to 95 percent by weight of 3-amino-5-undecyl-1,2,4-oxadiazole.

References Cited
UNITED STATES PATENTS 3,498,998   3/1970   Hughes _____ 71—92 X JAMES O. THOMAS, JR., Primary Examiner U.S. Cl. X.R.

71—66, 67

PO-1050
(5/69)

UNITED STATES PATENT OFFICE
CERTIFICATE OF CORRECTION

W22a

Patent No. 3,705,247            Dated December 5, 1972

Inventor(s) Herman Breuer

It is certified that error appears in the above-identified patent and that said Letters Patent are hereby corrected as shown below:

Column 1, line 60, the phrase "(Typha sp.," should read:
-- (Typha sp.), --

Column 1, line 64, the phrase "leaf Hydrolea sp.), should read -- leaf (Hyrolea sp.), --

Column 3, line 66, Example 2, after "of soil." delete the phrase -- 3-amino-5-n-undecyl-1,2,4-oxadiazole -- in its place insert the following:

-- The 2-methyl-1,3-diphenyl-1,3-propanedione --.

Column 4, line 61, Example 6, "Nematocidal dust" should read -- A nematocidal dust --.

Signed and sealed this 1st day of May 1973.

(SEAL)
Attest:

EDWARD M. FLETCHER, JR.
Attesting Officer

ROBERT GOTTSCHALK
Commissioner of Patents